(12) United States Patent
Yamamoto

(10) Patent No.: US 8,440,360 B2
(45) Date of Patent: May 14, 2013

(54) FUEL CELL DEVICE CAPABLE OF OUTPUTTING A SIGNAL REPRESENTING A RESIDUAL CAPACITY, METHOD FOR OUTPUTTING A SIGNAL REPRESENTING A RESIDUAL CAPACITY OF A FUEL CELL DEVICE, AND ELECTRONIC DEVICE CAPABLE OF DETECTING A RESIDUAL CAPACITY OF A FUEL CELL DEVICE

(75) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1455 days.

(21) Appl. No.: 10/563,719

(22) PCT Filed: Sep. 22, 2005

(86) PCT No.: PCT/JP2005/018056
§ 371 (c)(1),
(2), (4) Date: Jan. 5, 2006

(87) PCT Pub. No.: WO2006/035919
PCT Pub. Date: Mar. 6, 2006

(65) Prior Publication Data
US 2007/0111062 A1    May 17, 2007

(30) Foreign Application Priority Data

Sep. 28, 2004   (JP) .................................. 2004-281308

(51) Int. Cl.
*H01M 8/04* (2006.01)
*H01M 8/06* (2006.01)

(52) U.S. Cl.
USPC ............................ 429/443; 429/408; 429/428

(58) Field of Classification Search ....................... None
See application file for complete search history.

(56) References Cited

U.S. PATENT DOCUMENTS

| | | | |
|---|---|---|---|
| 5,366,820 A * | 11/1994 | Tsutsumi et al. | 429/421 |
| 5,728,483 A * | 3/1998 | Fujitani et al. | 429/12 |
| 6,586,124 B2 | 7/2003 | Kelley et al. | |
| 2001/0049038 A1 * | 12/2001 | Dickman et al. | 429/19 |
| 2002/0125267 A1 | 9/2002 | Gruenwald | |

FOREIGN PATENT DOCUMENTS

| | | |
|---|---|---|
| CN | 1460307 | 12/2003 |
| JP | 59-197546 A | 11/1984 |
| JP | 9-22711 A | 1/1997 |
| JP | 9-152653 | 6/1997 |

(Continued)

OTHER PUBLICATIONS

Written Opinion of the International Searching Authority and International Search Report dated Nov. 29, 2005.

(Continued)

*Primary Examiner* — Barbra Gilliam
*Assistant Examiner* — Adam A Arciero
(74) *Attorney, Agent, or Firm* — Cowan, Liebowitz & Latman, P.C.

(57) ABSTRACT

This invention provides a fuel cell device which is simple in structure and easy to detect a fuel residual amount and includes a fuel tank accommodating a plurality of hydrogen storage alloys having mutually different hydrogen desorbing characteristics, a power generating section that uses the hydrogen desorbed from the fuel tank to generate electric power, a pressure sensor that detects a pressure of the hydrogen supplied into the power generating section, and an output circuit that produces a pressure variation detected by the pressure sensor.

10 Claims, 17 Drawing Sheets

FOREIGN PATENT DOCUMENTS

| | | |
|---|---|---|
| JP | 11-230813 | 8/1999 |
| JP | 2000-340242 A | 12/2000 |
| JP | 2001-295996 | 10/2001 |
| JP | 2003-139298 | 5/2003 |
| JP | 2003-346856 | 12/2003 |
| JP | 2003-346857 | 12/2003 |
| JP | 2004-171945 | 6/2004 |
| JP | 2004-241261 A | 8/2004 |
| WO | 02/078104 A2 | 10/2002 |

OTHER PUBLICATIONS

Notification of First Office Action (PCT Appln entering the Chinese National Phase) in Chinese with Translation, dated Jun. 13, 2008.

* cited by examiner

STANDARD ALLOY(1) PCT CHARACTERISTICS

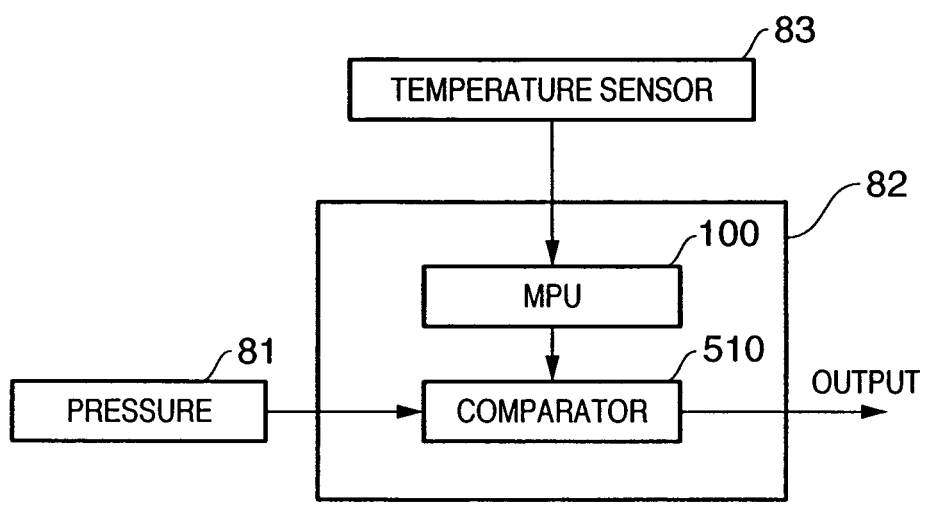
F I G. 7

9a

9b

9c

FUEL CELL DEVICE CAPABLE OF OUTPUTTING A SIGNAL REPRESENTING A RESIDUAL CAPACITY, METHOD FOR OUTPUTTING A SIGNAL REPRESENTING A RESIDUAL CAPACITY OF A FUEL CELL DEVICE, AND ELECTRONIC DEVICE CAPABLE OF DETECTING A RESIDUAL CAPACITY OF A FUEL CELL DEVICE

TECHNICAL FIELD

The present invention relates to residual amount detection of a fuel cell device, and more particularly relates to fuel residual amount detection of a fuel cell device using hydrogen storage alloys.

BACKGROUND ART

FIG. 16 schematically shows electric discharge characteristics of a solid polymer fuel cell to which fuel is supplied from a hydrogen storage alloy. The horizontal axis represents the time lapsed after an electric device starts consuming electric power of the fuel cell. The vertical axis represents an output voltage of this fuel cell. As understood from the electric discharge characteristics of FIG. 16, the fuel cell receives a sufficient amount of hydrogen in an early stage of the discharge.

Although, in the process of consuming electric power, the residual amount of hydrogen gradually decreases, the output voltage remains substantially constant. Then, at the final stage of the discharge where substantially no hydrogen fuel remains, the output voltage suddenly drops down to a very lower level and accordingly the electric device cannot operate normally.

Furthermore, as a notable characteristic, the above output voltage does not substantially depend on the pressure of supplied hydrogen.

Namely, the fuel cell maintains a constant output voltage regardless of reduction in the residual amount of the fuel. In other words, a residual amount detecting system relying on the voltage check of a battery is not applicable to the fuel cell device.

Hence, as a battery check method for the fuel cell device, various residual amount detect methods have been already proposed.

It is, for example, possible to prepare a plurality of fuel tanks and estimate a residual hydrogen amount by employing a valve open/close control and using the fuel tanks in turns (refer to the Japanese Patent Application Laid-open No. 2001-295996).

Furthermore, it is possible to combine a hydrogen storage tank with a residual fuel amount detecting tank and control the flow rate of respective tanks to estimate the residual hydrogen amount (refer to the Japanese Patent Application Laid-open No. 2003-139298).

In another method, the initial capacity and the consumed electric power are used to calculate the residual battery capacity (refer to the Japanese Patent Application Laid-open No. H11-230813, the Japanese Patent Application Laid-open No. 2004-171945, the Japanese Patent Application Laid-open No. 2003-346856, or the Japanese Patent Application Laid-open No. 2003-346857).

Furthermore, it is desirable to indicate a residual capacity of the battery detected according to the above-described battery check methods as precise as possible. Accordingly, it is desirable to employ a multistage display of the residual battery capacity.

Therefore, a stepwise display is proposed using a predetermined pattern efficiently indicating the degree of residual battery capacity (refer to the Japanese Patent Application Laid-open No. H09-152653).

A system calculating the residual amount based on the initial fuel capacity and a used amount cannot automatically detect the initial fuel capacity in a hydrogen storage alloy. Therefore, this system requires presetting of the initial fuel capacity to a constant value, or requires a manual input of the fuel initial capacity.

On the other hand, in the case that the initial fuel capacity is fixed to a constant value, it will be difficult to accurately detect the residual amount if a hydrogen storage alloy having an unpredictable initial capacity is used.

Furthermore, manually inputting the initial capacity is time-consuming and troublesome. In addition, an expensive flow rate meter will be necessary to detect the used fuel amount, or a storage tank for a resultant product may be required. As a result, the device will have a complicated arrangement and downsizing and cost reduction of the device cannot be achieved.

DISCLOSURE OF INVENTION

The present invention has been made in consideration of the above situation, and is directed to providing a fuel cell device using hydrogen storage alloys and a related electronic device which are simple in structure and capable of accurately and easily detecting a residual hydrogen amount in the fuel cell device.

An aspect of the present invention is to overcome the above-described drawbacks.

Another aspect of the present invention is to provide a fuel cell device capable of outputting a signal representing a residual hydrogen amount, including a tank section, a power generating section, a pressure detecting unit, and an output section.

The tank section accommodates a plurality of hydrogen storage alloys having mutually different hydrogen desorbing characteristics. The power generating section generates electric power by using hydrogen desorbed from the tank section. The pressure detecting unit detects a pressure of the hydrogen supplied to the power generating section. And, the output section outputs pressure variations caused on the basis of hydrogen desorbing characteristics of the plurality of hydrogen storage alloys which are detected by the pressure detecting unit.

Furthermore, another aspect of the present invention is to provide a method for outputting a signal representing a residual fuel cell capacity in a system including a tank section for accommodating a plurality of hydrogen storage alloys having mutually different hydrogen desorbing characteristics and a power generating section for generating electric power by using hydrogen desorbed from the tank section.

This method includes a pressure detecting step of detecting a pressure of the hydrogen supplied to the power generating section, and an outputting step of outputting pressure variations caused on the basis of hydrogen desorbing characteristics of the plurality of hydrogen storage alloys which are detected in the pressure detecting step.

Furthermore, another aspect of the present invention is to provide an electronic device capable of detecting a residual capacity of a fuel cell device, including a tank section, a power generating section, a pressure detecting unit, a residual amount detecting unit, and a control unit.

The tank section accommodates a plurality of hydrogen storage alloys having mutually different hydrogen desorbing characteristics. The power generating section generates electric power by using hydrogen desorbed from the tank section. The pressure detecting unit detects a pressure of the hydrogen supplied to the power generating section. The residual amount detecting unit detects a residual hydrogen amount by using pressure variations caused on the basis of hydrogen desorbing characteristics of the plurality of hydrogen storage alloys which are detected by the pressure detecting unit. And, the control unit operates with the electric power supplied from the power generating section.

Moreover, another aspect of the present invention is to provide a method for detecting a residual fuel cell capacity of an electronic device including a tank section for accommodating a plurality of hydrogen storage alloys having mutually different hydrogen desorbing characteristics and a power generating section for generating electric power by using hydrogen desorbed from the tank section.

This method includes a pressure detecting step of detecting a pressure of the hydrogen supplied to the power generating section, a residual amount detecting step of detecting a residual hydrogen amount by using pressure variations caused on the basis of hydrogen desorbing characteristics of the plurality of hydrogen storage alloys which are detected in the pressure detecting step, and a control step of causing a control section to operate with the electric power supplied from the power generating section.

Further features of the present invention will become more apparent from the following detailed description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7 is a block diagram showing an arrangement of a battery check system.

BEST MODE FOR CARRYING OUT THE INVENTION

Embodiments of the invention will be described in detail below with reference to the drawings.

[First Embodiment]

Figure 1A:
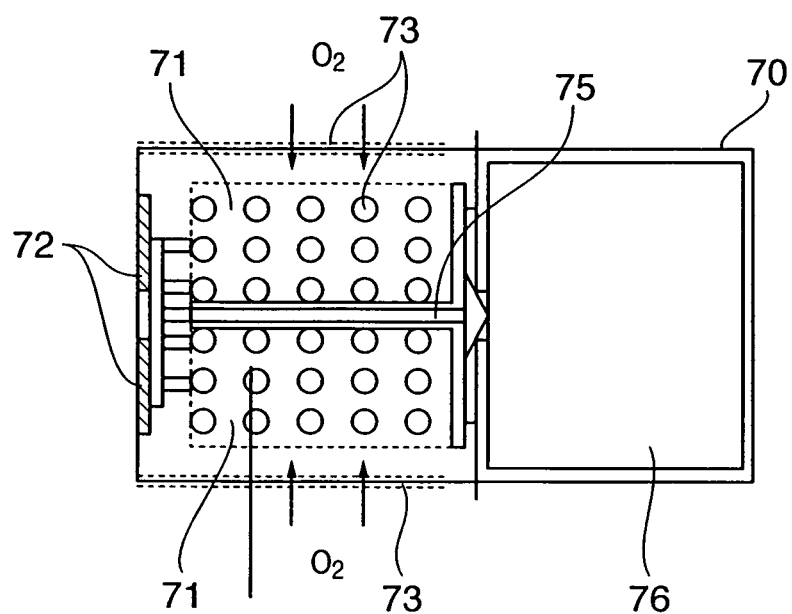
FIG. 1A is a plan view showing a fuel cell device.
Figure 1B:
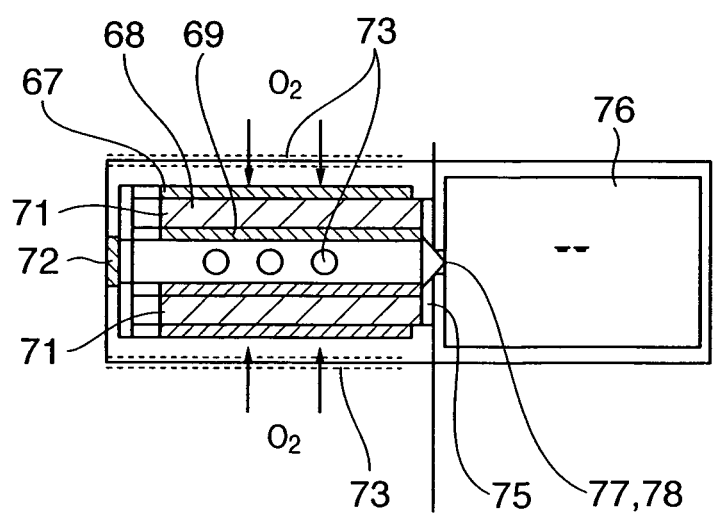
FIG. 1B is a front view of the fuel cell device of FIG. 1A.

FIG. 1A is a plan view showing a fuel cell device. FIG. 1B is a front view of the fuel cell device of FIG. 1A.

This fuel cell device causes the oxidizing reaction by using oxygen as an oxidizing agent and accordingly has air holes 73 on an upper surface, a lower surface, elongated side surfaces of a casing 70 to introduce the ambient air into the casing 70. Each air hole 73 has also a function of letting out the produced water as water vapor from the casing 70 and dissipating the heat generated by the reaction to the outside of the casing 70. Furthermore, the casing 70 has a short side surface on which electrodes 72 are provided to output electric power.

The casing 70 accommodates a cell section 71 including one or more cells, a fuel tank 76, and a fuel flow passage 75. Each cell 71 consists of an oxygen electrode 67, a solid polymer film 68, a fuel electrode 69, and a catalyst. The fuel tank 76 stores the fuel. The fuel flow passage 75 connects the fuel tank 76 to the fuel electrode 69 of each cell.

The hydrogen stored in the fuel tank 76 is supplied via the fuel flow passage 75 to the fuel electrode 69. Meanwhile, the ambient air is supplied from the outside via the air holes 73 to the oxygen electrode 67. The electric power generated by the fuel cell is supplied via the electrode 72 to an electronic device which operates with electric power supplied from the fuel cell.

Furthermore, each electrode 72 is insulated at a portion where the electrode 72 contacts with the water produced as a result of electrolysis occurring during the power generation in the fuel cell. Thus, no electrical path connecting the electrodes 72 when they are soaked in the water is formed.

As an insulating method, the electrode 72 can be coated with an insulator except a portion where the electrode 72 contacts with the solid polymer film 68.

Furthermore, the solid polymer film 68 used for this fuel cell has a pressure durability of 0.3 to 0.5 MPa. Thus, the fuel cell should be used in an environment having a pressure difference of 0.1 MPa or less with respect to the difference between the external and internal pressures.

Hence, it will be preferable to provide a pressure reducing valve 78 between the fuel tank 76 and the fuel electrode 69 if the desorbed hydrogen pressure of a used hydrogen storage alloy is high.

For example, if the size of unit cell is 1.2 cm×2 cm, the fuel cell has an electromotive force of approximately 0.8 V and a current density of approximately 300 mA/cm². If a total of 8 fuel cells are connected in series, the fuel cell device will have as a whole an output of approximately 6.4 V with 720 mA, i.e., approximately 4.6 W.

In FIGS. 1A and 1B, two fuel cells identical with each other in their area size are illustrated as being laminated. However, the number of fuel cells to be laminated is not limited to a specific number. Therefore, a higher output voltage will be obtained when an increased number of laminated fuel cells are connected in series.

Figure 2:
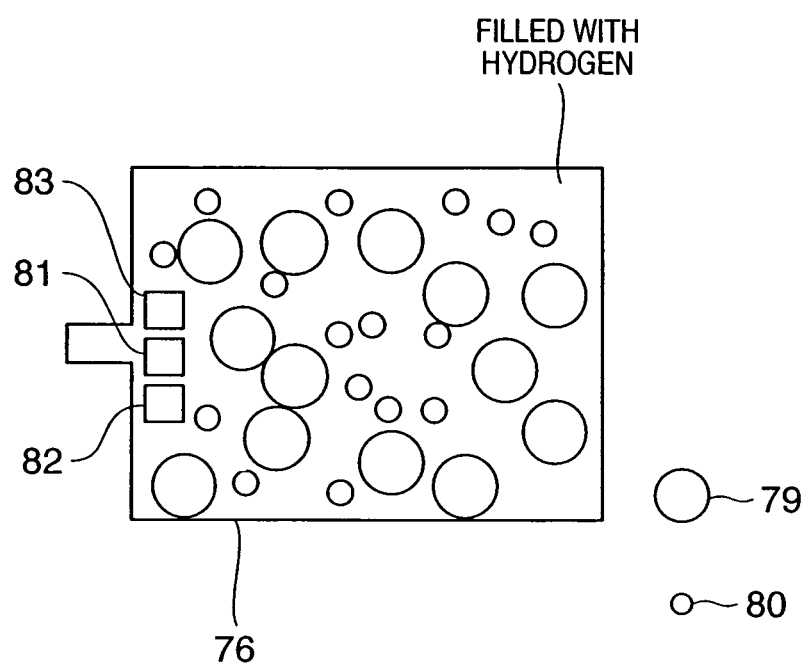
FIG. 2 is a view showing a tank section in accordance with a first embodiment of the present invention.

FIG. 2 shows a detailed structure of the fuel tank 76. The fuel tank 76 includes a first hydrogen storage alloy 79, a second hydrogen storage alloy 80, a pressure sensor 81, an output circuit 82, and a temperature sensor 83. The inside of the fuel tank 76 is filled with hydrogen desorbed from the hydrogen storage alloys.

Figure 3A:
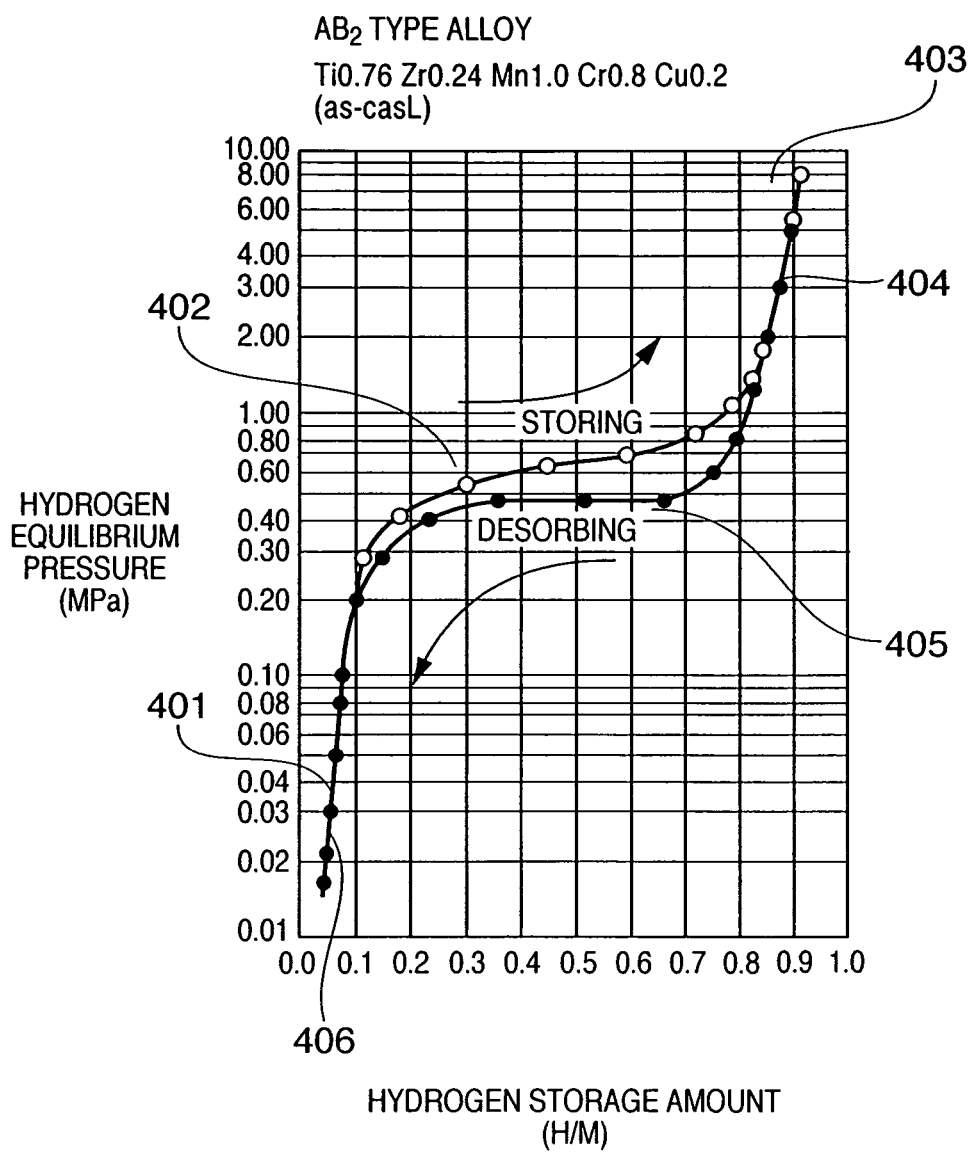
FIG. 3A is a graph showing hydrogen desorbing characteristics of an $AB_2$-type hydrogen storage alloy.
Figure 3B:
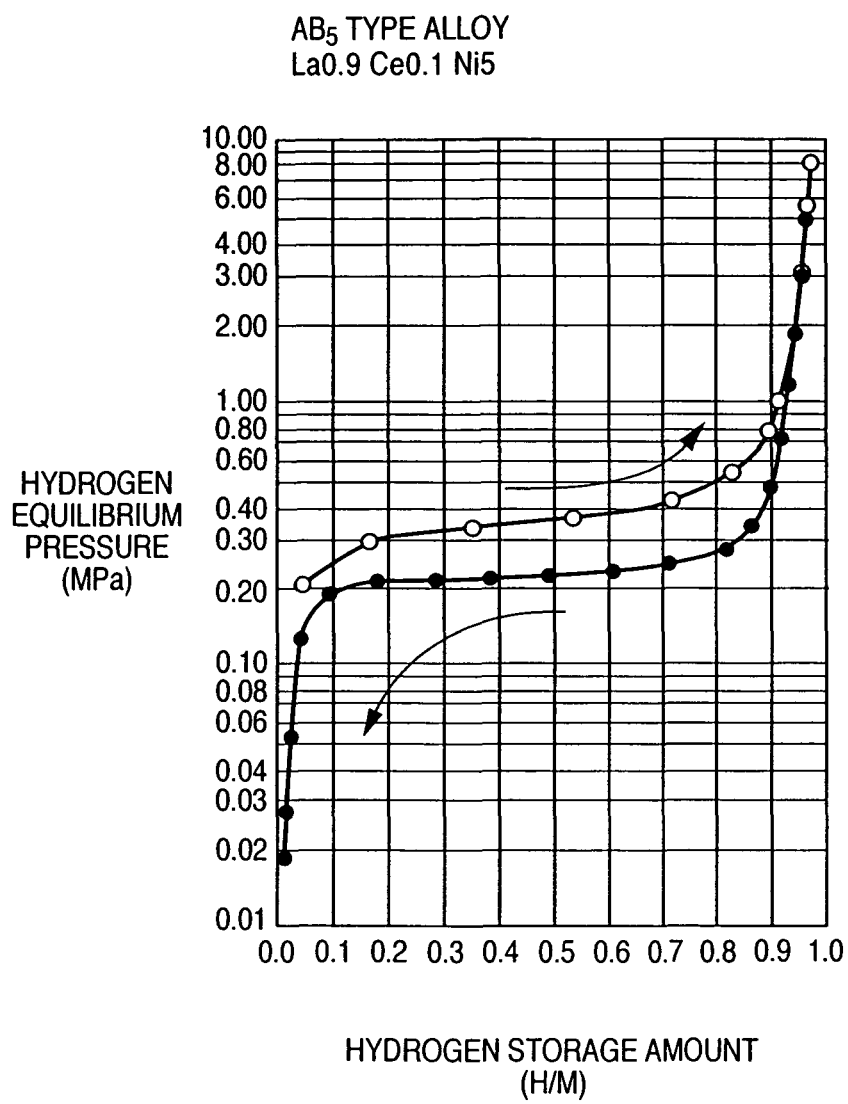
FIG. 3B is a graph showing hydrogen desorbing characteristics of an $AB_5$-type hydrogen storage alloy.

FIGS. 3A and 3B respectively show the hydrogen storing and desorbing characteristics of typical hydrogen storage alloys. The hydrogen storing and desorbing characteristics of a hydrogen storage alloy show three stages in each of the hydrogen storing process (or hydrogen adsorbing process) and the hydrogen desorbing process.

In FIGS. 3A and 3B, one line connecting white dots represents the characteristics in the hydrogen storing process. The sequential states $401 \to 402 \to 403$ correspond to the start through the end of the storing process. The other line connecting black dots represents the characteristics in the hydrogen desorbing process. The sequential states $404 \to 405 \to 406$ correspond to the start through the end of the desorbing process.

First of all, the hydrogen storing characteristics is explained in detail.

The hydrogen is introduced from the outside and directly stored in the hydrogen storage alloy, at the interstitial position of the crystal lattice, under a given hydrogen pressure (phase 401). When the pressure of the hydrogen supplied from the outside exceeds a predetermined level, hydrogen molecules start chemically bonding with the hydrogen storage alloy (phase 402).

When the higher hydrogen pressure is further applied from the outside, the highly pressurized hydrogen molecules are forced to enter into the interstitial position of the crystal lattice of the hydrogen storage alloy even after the hydrogen amount exceeds a chemically bondable range. Thus, the hydrogen is continuously stored in the hydrogen storage alloy (phase 403).

Next, the hydrogen desorbing characteristics is explained in detail.

When the external air pressure is lower than the hydrogen pressure in the interstitial position of the crystal lattice, the hydrogen leaves the interstitial position of the crystal lattice of the hydrogen storage alloy and goes to the outside.

In this case, the pressure of the desorbed hydrogen decreases together with decrease of the storage amount of the hydrogen (phase 404). When the desorbed hydrogen pressure further decreases, the hydrogen having been chemically bonded with the hydrogen storage alloy starts leaving from the hydrogen storage alloy and exits to the outside. In this stage of the hydrogen desorbing process, the pressure of the desorbed hydrogen substantially remains at a constant level and is accordingly in a pressure equilibrium state (phase 405).

The desorbing of the hydrogen continues until the hydrogen chemically bonded with the hydrogen storage alloy becomes nonexistent and the desorbed hydrogen pressure starts decreasing (phase 406). According to the present invention, the state of phase 405 in the hydrogen desorbing process is referred to as a pressure equilibrium state.

In general, a hydrogen storage alloy, which has a pressure equilibrium state lasting for a long time, can store a great amount of hydrogen per unit weight and is suitable for a portable device.

The desorbed hydrogen pressure in the pressure equilibrium state 405 is dependent on the composition of the hydrogen storage alloy, as understood from FIGS. 3A and 3B. For example, according to an $AB_2$-type alloy shown in FIG. 3A which has the composition of $Ti_{0.76}Zr_{0.24}Mn_{1.0}Cr_{0.8}Cu_{0.2}$, the desorbed hydrogen pressure in the pressure equilibrium state 405 is approximately 0.48 MPa.

According to an $AB_5$-type alloy shown in FIG. 3B which has the composition of $La_{0.9}Ce_{0.1}Ni_5$, the desorbed hydrogen pressure in the pressure equilibrium state 405 is approximately 0.2 MPa. Furthermore, the temperature greatly influences the desorbed hydrogen pressure.

Figure 4:
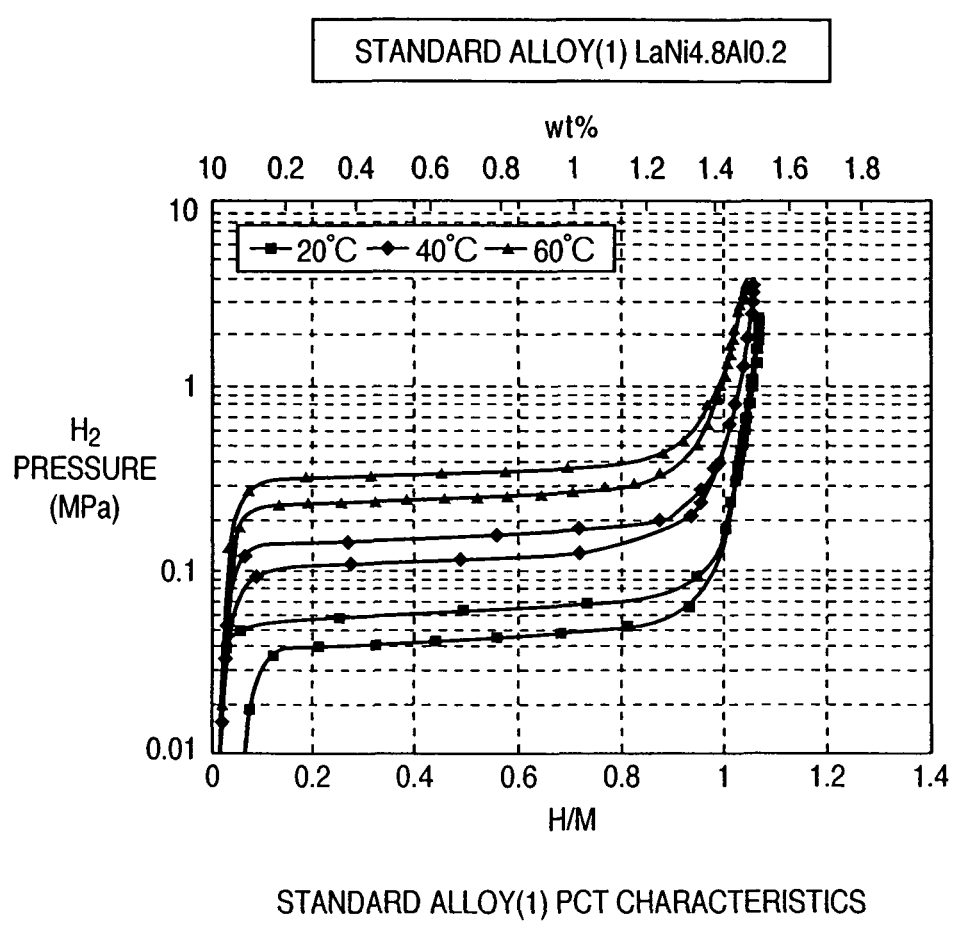
FIG. 4 is a graph showing temperature dependence of the hydrogen desorbing characteristics of a standard hydrogen storage alloy.

FIG. 4 shows the temperature dependence in the hydrogen desorbing characteristics of a hydrogen storage alloy. More specifically, according to the hydrogen storage alloy of $LaNi_{4.8}Al_{0.2}$, the desorbing pressure in the pressure equilibrium state at 20° C. is 0.04 MPa. The desorbing pressure in the pressure equilibrium state at 60° C. is 0.115 MPa.

According to this embodiment, the first hydrogen storage alloy 79 has a higher value with respect to the desorbed hydrogen pressure in the pressure equilibrium state compared with the second hydrogen storage alloy 80. For example, the first hydrogen storage alloy 79 is the $AB_2$-type hydrogen storage alloy having the composition of $Ti_{0.76}Zr_{0.24}Mn_{1.0}Cr_{0.8}Cu_{0.2}$ which has the desorbed hydrogen pressure of 0.48 MPa in the pressure equilibrium state as described above.

The second hydrogen storage alloy 80 has a lower desorbed hydrogen pressure in the pressure equilibrium state than the first hydrogen storage alloy 79. For example, the second hydrogen storage alloy 80 is the above-described $AB_5$-type hydrogen storage alloy having the composition of $La_{0.9}Ce_{0.1}Ni_5$ which has the desorbed hydrogen pressure of 0.2 MPa in the pressure equilibrium state.

Figure 5:
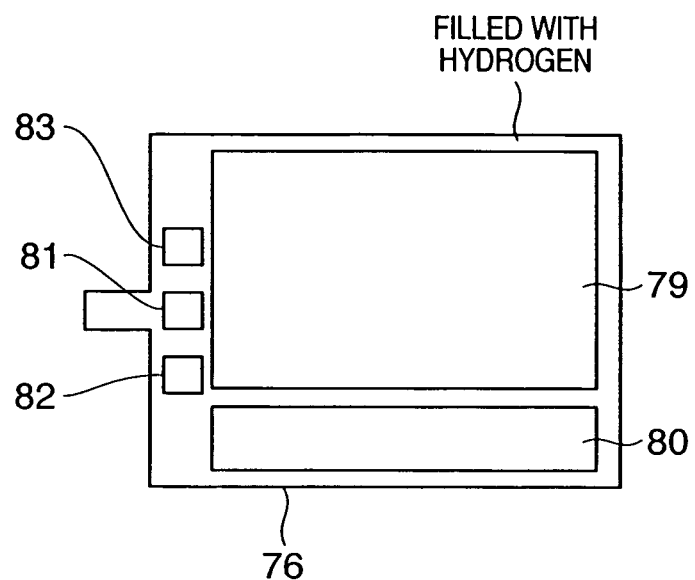
FIG. 5 is a view showing a tank section in accordance with a modified embodiment of the first embodiment of the present invention.

Regarding the holding structure of a plurality of hydrogen storage alloys, FIG. 2 shows two kinds of hydrogen storage alloys in a grain state which are mixed together in the fuel tank 76. It is, however, possible to fill the fuel tank 76 with two solid blocks of the first and second hydrogen storage alloys as shown in FIG. 5.

Regarding the amount of the hydrogen storage alloy, the first hydrogen storage alloy (i.e., $Ti_{0.76}Zr_{0.24}Mn_{1.0}Cr_{0.8}Cu_{0.2}$) weighs, for example, 30 g and the second hydrogen storage alloy (i.e., $La_{0.9}Ce_{0.1}Ni_5$) weighs 10 g. Both of the above-described hydrogen storage alloys have the capability of adsorbing and desorbing the hydrogen by the amount of approximately 1 wt % per weight. Therefore, 0.4 g of the hydrogen is stored in the fuel tank 76. The generable electric energy is approximately 11.3 [W·h] which is approximately 4 times the generable electric energy of a conventional lithium ion cell.

Figure 6:
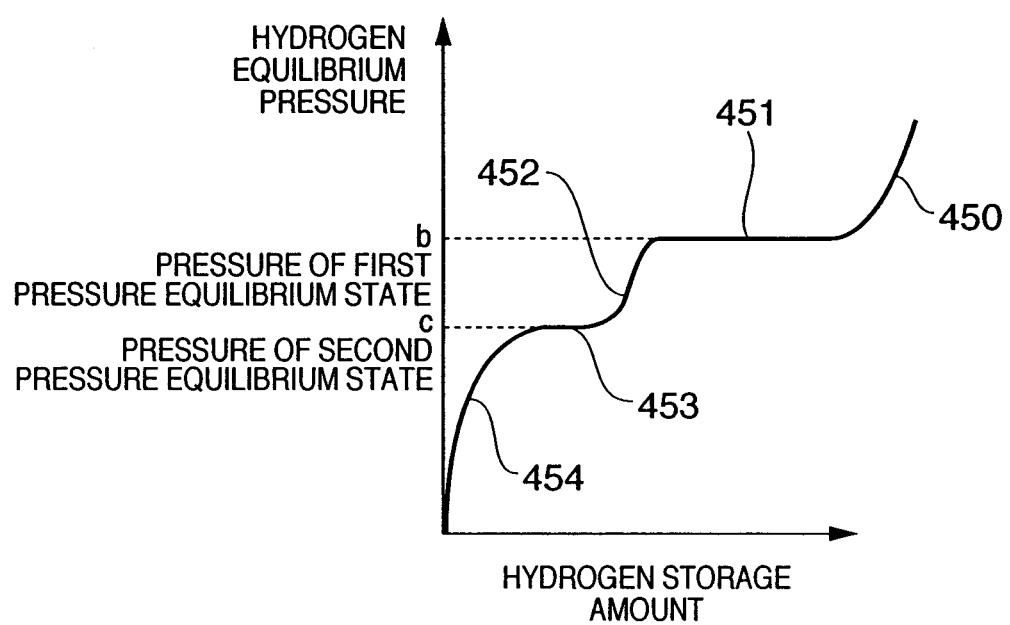
FIG. 6 is a graph schematically showing one example of the hydrogen desorbing characteristics obtained when a composite of two kinds of hydrogen storage alloys is used.

FIG. 6 schematically shows variation in the hydrogen pressure of the fuel tank 76 having the above-described arrangement. The pressure variation of the fuel tank 76 in each of five states 450 to 454, i.e., from a state where the hydrogen is sufficiently stored to a state where hydrogen storage amount decreases due to power generation, will be explained hereinafter.

The state 450 is a transitional state where the hydrogen is desorbed from the interstitial position of the crystal lattice between the first hydrogen storage alloy and the second hydrogen storage alloy. In this state, the pressure decreases in accordance with desorbing of the hydrogen. This state continues until the pressure level reaches the pressure equilibrium state of the first hydrogen storage alloy.

The state 451 is a first pressure equilibrium state, in which the hydrogen is desorbed from the first hydrogen storage alloy under a constant pressure attained in the pressure equilibrium state of the first hydrogen storage alloy.

In this case, the second hydrogen storage alloy is left in an equilibrium state between the desorbing phase and the storing phase and accordingly hydrogen is not desorbed from the second hydrogen storage alloy. This state continues until the hydrogen chemically bonded with the first hydrogen storage alloy is almost desorbed.

The state 452 is a transitional state where the hydrogen is desorbed from the interstitial position of the crystal lattice between the first hydrogen storage alloy and the second hydrogen storage alloy. In this state, the pressure decreases in accordance with desorbing of the hydrogen. This state continues until the pressure level reaches the pressure equilibrium state of the second hydrogen storage alloy.

The state 453 is a second pressure equilibrium state, in which the hydrogen is desorbed from the second hydrogen storage alloy under a constant pressure attained in the pressure equilibrium state of the second hydrogen storage alloy. In this case, the first hydrogen storage alloy is left in an equilibrium state between the desorbing phase and the storing phase and accordingly no hydrogen is desorbed from the first hydrogen storage alloy. This state continues until the hydrogen chemically bonded with the second hydrogen storage alloy is almost desorbed.

The state 454 is a transitional state where the hydrogen is desorbed from the interstitial position of the crystal lattice between the first hydrogen storage alloy and the second hydrogen storage alloy. In this state, the pressure decreases in accordance with desorbing of the hydrogen. This state continues until the hydrogen is entirely desorbed from both of the first and second hydrogen storage alloys.

The duration of the first pressure equilibrium state 451 is proportional to the hydrogen amount stored in the first hydrogen storage alloy. The duration of the second pressure equilibrium state 453 is proportional to the hydrogen amount stored in the second hydrogen storage alloy.

For example, according to the above-described arrangement in which the first hydrogen storage alloy (i.e., $Ti_{0.76}Zr_{0.24}Mn_{1.0}Cr_{0.8}Cu_{0.2}$) weighs 30 g and the second hydrogen storage alloy (i.e., $La_{0.9}Ce_{0.1}Ni_5$) weighs 10 g, their ratio with respect to the stored hydrogen amount becomes approximately 3:1. Thus, the duration of the first pressure equilibrium state 451 is approximately 3 times the duration of the second pressure equilibrium state 453.

Accordingly, these durations can be adjusted by changing the mixing ratio of the first hydrogen storage alloy and the second hydrogen storage alloy so that an output timing of a residual battery capacity can be flexibly set considering the state of the residual fuel amount. In other words, the residual amount detection in accordance with the usage of the fuel cell device is feasible.

FIG. 7 is a block diagram showing an arrangement of a battery check system.

The pressure sensor 81 detects the pressure within the hydrogen cylinder and inputs a detected pressure value to a comparator 510 of the output circuit 82. Furthermore, the temperature sensor 83 detects the temperature within the hydrogen cylinder and inputs a detected temperature value to a micro processing unit (MPU) of a microcomputer 100.

The microcomputer 100 reads a pressure value of the pressure equilibrium state corresponding to the detected temperature of each hydrogen storage alloy with reference to a table stored in a memory of the microcomputer 100. The microcomputer 100 sends the readout pressure value to the comparator 510 of the output circuit 82.

The output circuit 82 produces an output which varies in accordance with the entered pressure value of the hydrogen storage alloy and the readout pressure value of the pressure equilibrium state.

Figure 8:
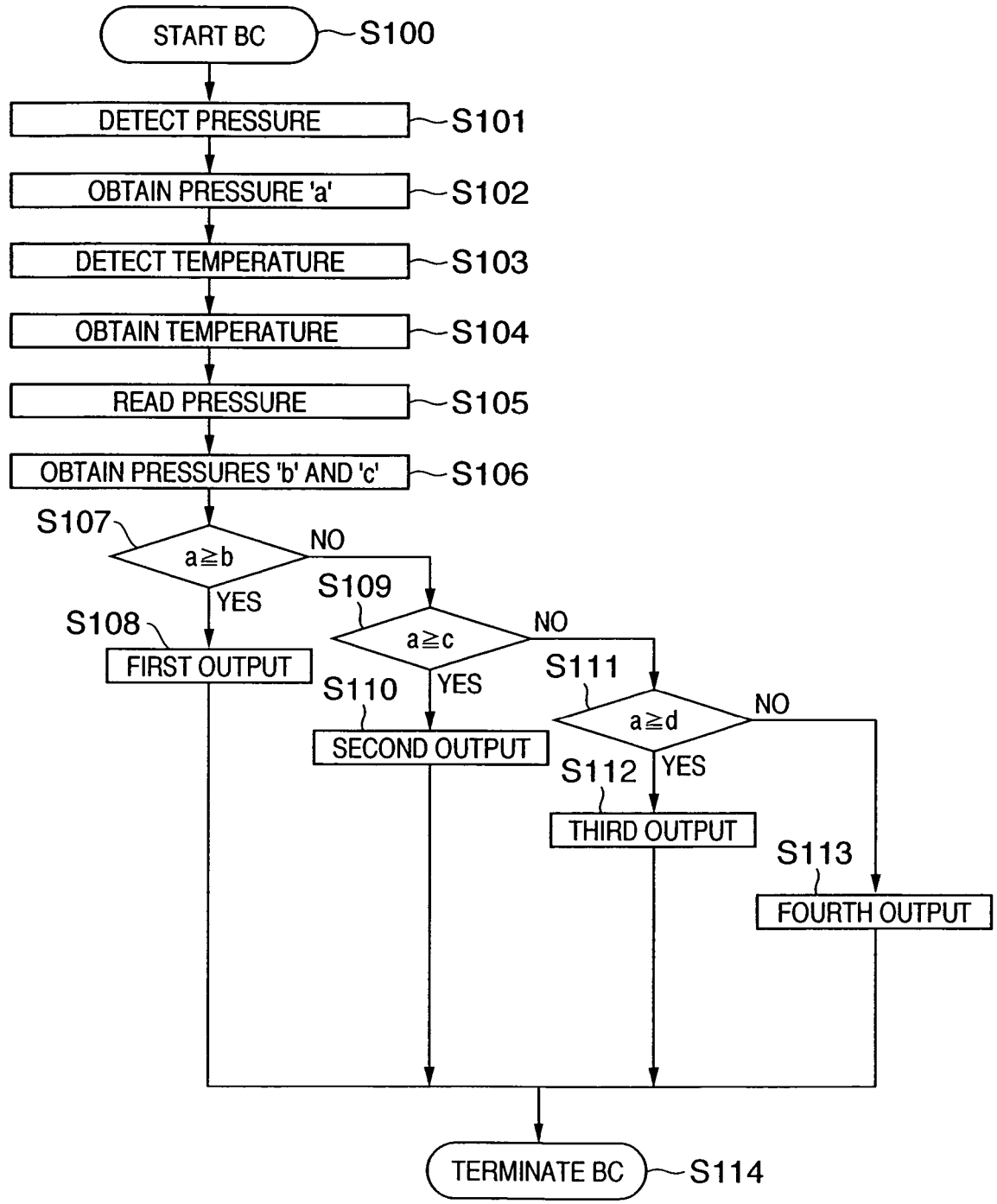
FIG. 8 is a flowchart showing a battery check control in accordance with the first embodiment of the present invention.

With reference to a flowchart shown in FIG. 8, a battery check control performed by the output circuit 82 is explained.

In step S100, the battery check begins. In step S101, the pressure sensor 81 detects the pressure within the hydrogen cylinder. Hereinafter, the pressure of the hydrogen cylinder detected by the pressure sensor 81 is referred to as 'a'. In step S102, the microcomputer 100 obtains the pressure 'a' within the hydrogen cylinder. In step S103, the temperature sensor 83 detects the temperature within the hydrogen cylinder.

The microcomputer 100, in the step S104, obtains the temperature value of the hydrogen cylinder from the temperature sensor 83. In step S105, the microcomputer 100 reads pressure 'b' and pressure 'c' from the table prepared in the microcomputer. The pressures 'b' and 'c' are pressure values obtainable in the pressure equilibrium state corresponding to the obtained temperature. More specifically, the pressure 'b' represents the pressure in the first pressure equilibrium state. The pressure 'c' represents the pressure in the second pressure equilibrium state.

The processing of the steps S101 to S102 can be executed simultaneously with the processing of the steps S103 to S106. In step S107, the comparator 510 compares the pressure 'a' of the hydrogen cylinder with the pressure 'b' of the first pressure equilibrium state. When the comparison result in the step S107 shows that the pressure 'a' of the hydrogen cylinder is equal to or higher than the pressure 'b' of the first pressure equilibrium state, the microcomputer 100 proceeds to step S108 to cause the output circuit 82 to produce a first output signal value 700. Then, the battery check ends.

When the pressure 'a' within the hydrogen cylinder is lower than the pressure 'b' within the first pressure equilibrium state, the microcomputer 100 proceeds to step S109 to further compare the pressure 'a' within the hydrogen cylinder with the pressure 'c' of the second pressure equilibrium state. When the comparison result in the step S109 shows that the pressure 'a' within the hydrogen cylinder is equal to or higher than the pressure 'c' of the second pressure equilibrium state, the microcomputer 100 proceeds to step S110 to cause the output circuit 82 to produce a second output signal value 701. Then, the battery check ends.

When the pressure 'a' within the hydrogen cylinder, is lower than the pressure 'c' of the second pressure equilibrium state, the microcomputer 100 proceeds to step S111 to further compare the pressure 'a' within the hydrogen cylinder with a shutdown pressure 'd'. The shutdown pressure 'd' is a minimum hydrogen supply pressure required to drive a device. For example, shutdown pressure 'd' is set beforehand to 5% of the maximum storage amount. Namely, the shutdown pressure 'd' is set to a value larger than 0 but smaller than the pressure 'c' of the second pressure equilibrium state.

When the comparison result in the step S111 shows that the pressure 'a' within the hydrogen cylinder is equal to or higher than the shutdown pressure 'd', the microcomputer 100 proceeds to step S112 to cause the output circuit 82 to produce a third output signal value 702. Then, the battery check ends. When the pressure 'a' within the hydrogen cylinder is lower than the shutdown pressure 'd', the microcomputer 100 proceeds to step S113 to cause the output circuit 82 to produce a fourth output signal value 703. Then, the battery check ends.

Figure 9:
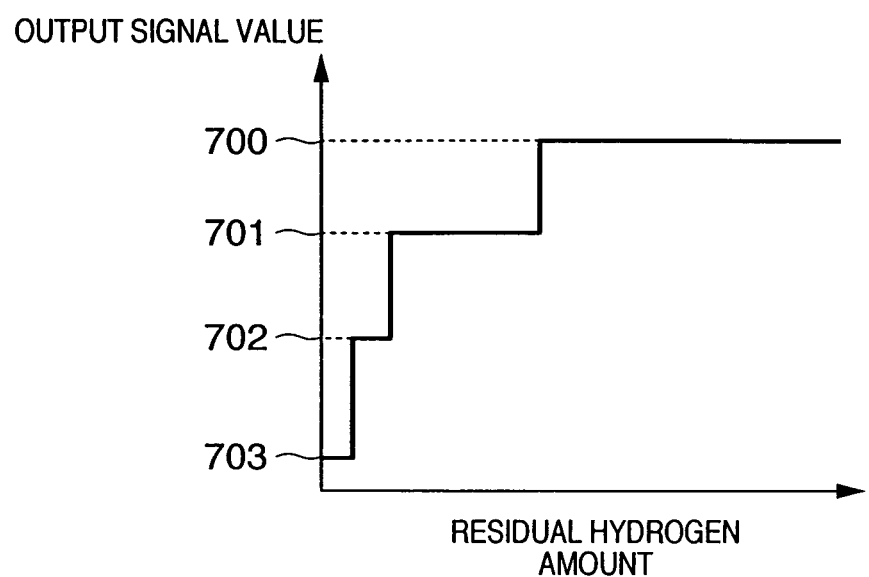
FIG. 9 is a graph showing output signal values in accordance with the first embodiment of the present invention.

The processing shown in the flowchart of FIG. 8 can be repeated at constant time intervals or in accordance with the sequence of an associated device. Furthermore, the first output signal value 700, the second output signal value 701, the third output signal value 702, and the fourth output signal value 703 have to be mutually different. FIG. 9 shows an example of these output signal values used in the above-described processing.

As shown in FIG. 9, when the pressure a' within the fuel tank is not lower than the pressure 'b' of the first pressure equilibrium state, the output circuit 82 produces the first output signal value 700. When the pressure a' within the fuel tank is lower than the pressure 'b' of the first pressure equilibrium state and not lower than the pressure 'c' of the second pressure equilibrium state, the output circuit 82 produces the second output signal value 701.

When the pressure a' within the fuel tank is lower than the pressure 'c' of the second pressure equilibrium state and not lower than the shutdown pressure 'd', the output circuit 82 produces the third output signal value 702. When the pressure a' within the fuel tank is lower than the shutdown pressure 'd', the output circuit 82 produces the fourth output signal value 704.

[Modified Embodiment of the First Embodiment]

Figure 10:
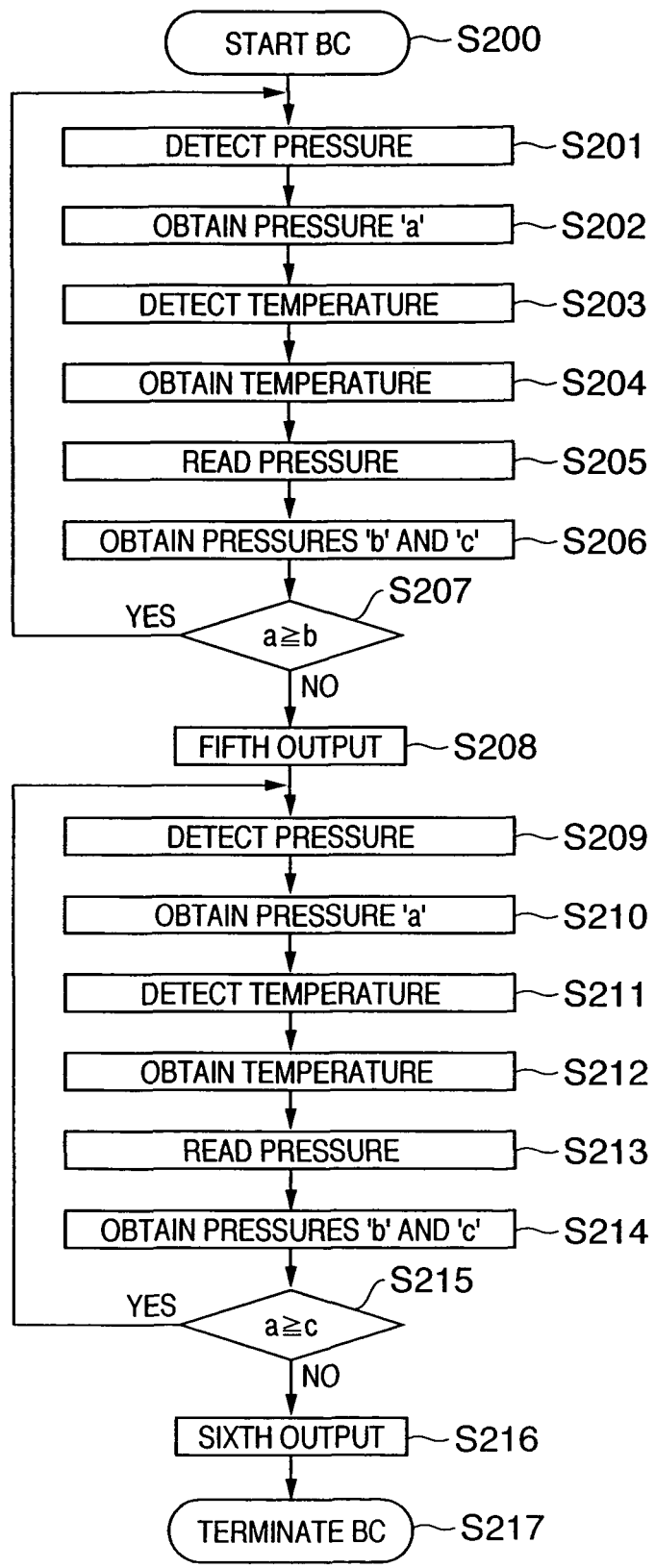
FIG. 10 is a flowchart showing a modified embodiment of the battery check control in accordance with the first embodiment of the present invention.

Next, a modified embodiment of the battery check control performed by the output circuit 82 is explained with reference to the flowchart of FIG. 10.

A sequential processing starting from step S200 in which the battery check starts to step 207 in which the comparator 510 compares the pressure 'a' within the hydrogen cylinder with the pressure 'b' of the first pressure equilibrium state is identical with the above-described processing of step S100 to step S107 of FIG. 8 and is not explained herein.

When the comparison result in the step S207 shows that the pressure 'a' within the hydrogen cylinder is equal to or higher than the pressure 'b' of the first pressure equilibrium state, the microcomputer 100 returns to step S201 after a predetermined waiting time passes. When the pressure 'a' within the hydrogen cylinder is lower than the pressure 'b' of the first pressure equilibrium state, the microcomputer 100 proceeds to step S208 to cause the output circuit 82 to produce a fifth output signal value 704.

The next sequential processing from step S209 to step S214 is identical with the above-described processing of step S201 to step S206 and accordingly is not explained herein.

In step S215, the microcomputer 100 causes the comparator 510 to compare the pressure 'a' within the hydrogen cylinder with the pressure 'c' of the second pressure equilibrium state. When the comparison result in the step S215 shows that the pressure 'a' within the hydrogen cylinder is equal to or higher than the pressure 'c' of the second pressure equilibrium state, the microcomputer 100 returns to step S209 after a predetermined waiting time passes.

Figure 11:
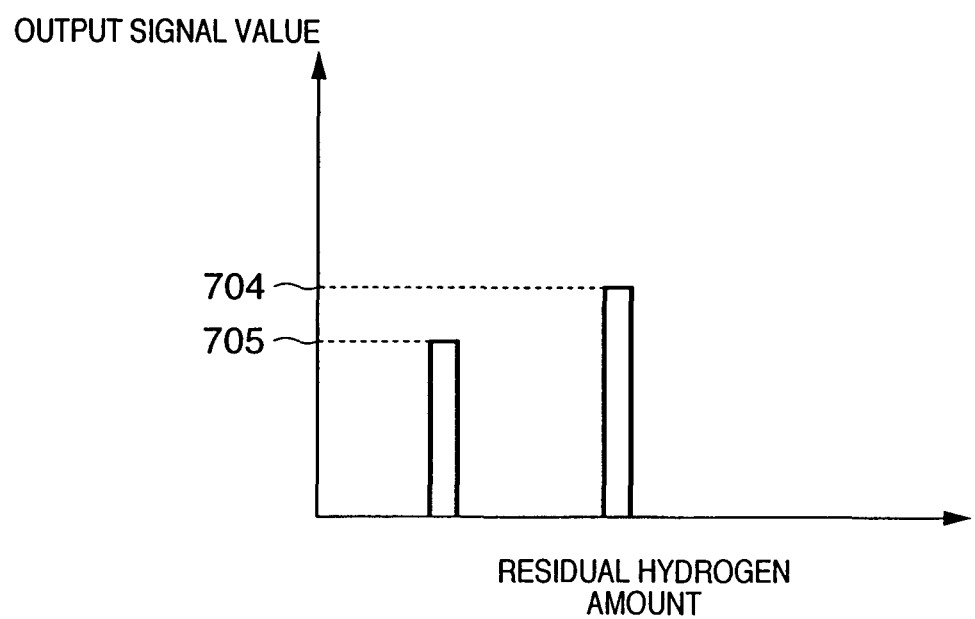
FIG. 11 is a graph showing a modified example of the output signal values in accordance with the first embodiment of the present invention.

On the other hand, when the pressure 'a' within the hydrogen cylinder is lower than the pressure 'c' of the second pressure equilibrium state, the microcomputer 100 proceeds to step S216 to cause the output circuit 82 to produce a sixth output signal value 705 and terminates the battery check. FIG. 11 shows an example of the output signal values obtained in the above-described processing.

As shown in FIG. 11, the output circuit 82 outputs a pulse with the fifth output signal value 704 only one time when the pressure 'a' within the tank 76 becomes lower than the pressure 'b' of the first pressure equilibrium state. Furthermore, the output circuit 82 outputs a pulse with the sixth output signal value 705 only one time when the pressure 'a' within the tank 76 becomes lower than the pressure 'c' of the second pressure equilibrium state.

In this manner, the modified embodiment is different from the above-described first embodiment in that the output circuit 82 performs the output operation only when the pressure 'a' within the fuel tank changes. According to this modified embodiment, the fifth output signal value 704 and the sixth output signal value 705 can be set to any values. For example, these values can be equal if the information relating to the output of the fifth output signal value 704 is maintained.

Furthermore, according to this embodiment, the fifth output signal value 704 is outputted at a timing when the pressure 'a' within the tank becomes lower than the pressure 'b' of the first pressure equilibrium state. However, the fifth output signal value 704 may be outputted when the pressure 'a' within the tank becomes equal to the pressure 'c' of the second pressure equilibrium state.

Furthermore, according to this embodiment, the fuel tank section includes two types of hydrogen storage alloys. It is, however, possible to use a fuel tank section including three or more types of hydrogen storage alloys. In this case, the number of pressure variations occurring until the fuel tank becomes empty increases. Therefore, the four-stage fuel residual amount detection described in the above embodiment can be modified to include five or more stages for the fuel residual amount detection.

Furthermore, the temperature detected by the temperature sensor 83 is not limited to the temperature within the fuel tank 76 but can be the temperature of the hydrogen storage alloy. Especially, if the fuel tank 76 has the arrangement shown in FIG. 5, the temperature is different in each of a plurality of hydrogen storage alloys. Therefore, it is preferable to detect the temperature of each hydrogen storage alloy.

Moreover, according to this embodiment, the pressure sensor 81 serves as a means for detecting the pressure and the output circuit 82 serves as an output section. However, the present invention is not limited to the above-described embodiments but a pressure control valve or other mechanical arrangement can also accomplish the similar functions and effects.

[Second Embodiment]

Next, the second embodiment of the present invention is explained.

Figure 12:
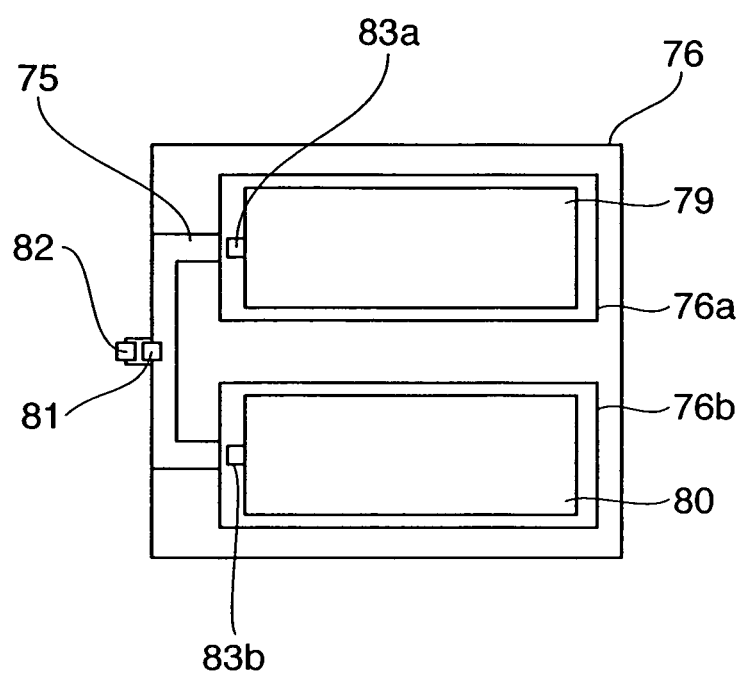
FIG. 12 is a view showing a tank section in accordance with a second embodiment of the present invention.

The second embodiment differs from the first embodiment in the arrangement of the fuel tank section. Hereinafter, the fuel tank section of this embodiment will be explained with reference to FIG. 12. As shown in FIG. 12, the fuel tank includes two separate fuel tank sections.

More specifically, the first hydrogen storage alloy 79 is stored in the first fuel tank 76*a* and the second hydrogen storage alloy 80 is stored in the second fuel tank 76*b*. The first fuel tank 76*a* and the second fuel tank 76*b* may be independently removed from the fuel tank 76. Two temperature sensors, i.e., a temperature sensor 83*a* and a temperature sensor 83*b*, measure the temperatures of the first hydrogen storage alloy 79 and the second hydrogen storage alloy 80 respectively.

The hydrogen desorbed from the first and second fuel tanks 76*a* and 76*b* is supplied via the fuel flow passage 75 to the fuel electrode 69. The fuel flow passage 75 is equipped with the pressure sensor 81. The pressure sensor 81 detects a combined pressure of the hydrogen desorbed from respective fuel tanks 76*a* and 76*b*. The comparator 510 of the output circuit 82 inputs an output signal of the pressure sensor 81 which represents the pressure within the hydrogen cylinder.

Furthermore, the microcomputer 100 inputs the signals produced from the temperature sensors 83*a* and 83*b*, which respectively represent the temperatures of two different hydrogen storage alloys. The microcomputer 100 reads, from a prepared table, pressure values of the pressure equilibrium state corresponding to the detected temperature of each hydrogen storage alloy. Then, the microcomputer 100 sends the readout pressure values of the pressure equilibrium state to the comparator 510 of the output circuit 82.

The output circuit 82 performs the output operation differently depending on the received input data, i.e., the pressure of the hydrogen storage alloy and the pressure of the pressure equilibrium state. The battery check control performed by the output circuit 82 is substantially identical with the above-described first embodiment and is not explained herein.

[Third Embodiment]

Figure 13:
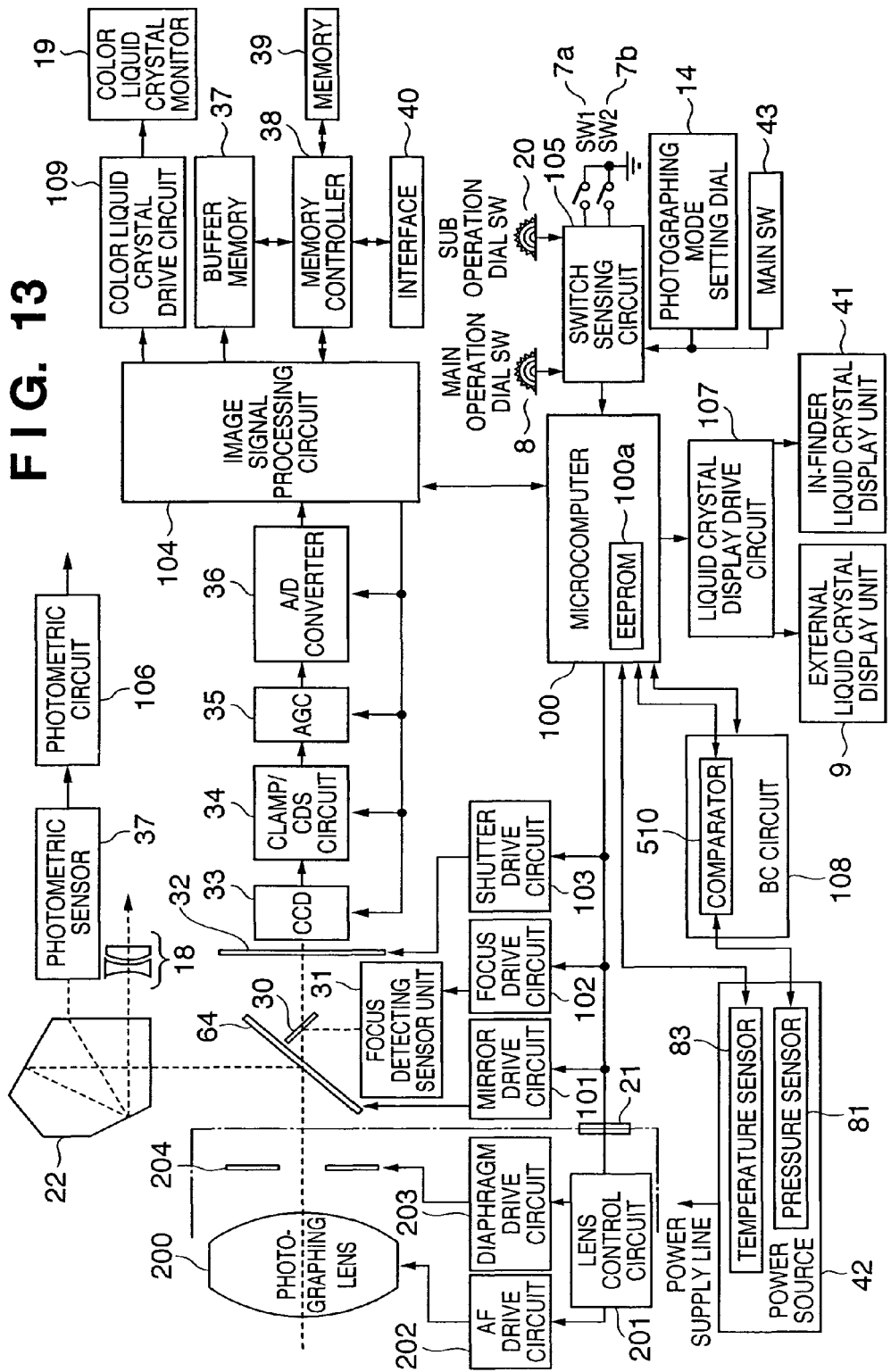
FIG. 13 is a block diagram showing an electric arrangement of a digital single-lens reflex camera.

Next, a third embodiment of this invention is explained. This embodiment uses a digital single-lens reflex camera as an electronic device. FIG. 13 is a block diagram showing an electric arrangement of the digital single-lens reflex camera according to the third embodiment of this invention.

A power source section 42 incorporates a fuel cell using hydrogen storage alloys. The power source section of this embodiment is different only in the inside arrangement of the fuel tank compared with the first or second embodiment. According to this embodiment, it is not necessary to place the output circuit in the fuel tank. A battery check (BC) circuit 108 installed in a camera can operate in the same manner as the output circuit 82 of the first or second embodiment.

More specifically, a pressure sensor 81 equipped in the power source section 42 detects the pressure within the fuel tank. A comparator 510 in the battery check circuit 108 inputs a pressure value detected by the pressure sensor 81. Furthermore, a temperature sensor 83 detects the temperature within the fuel tank. The microcomputer 100 inputs a temperature value detected by the temperature sensor 83.

The microcomputer 100 reads a pressure value of the pressure equilibrium state in the fuel tank with reference to the table based on the entered temperature. This table can be stored in a memory (e.g., EEPROM) 100a of the microcomputer 100. The microcomputer 100 sends the readout pressure value of the pressure equilibrium state to the comparator 510 of the BC circuit 108.

The rest of the arrangement of this embodiment is substantially identical with a conventional digital single-lens reflex camera, and accordingly is simply explained herein.

An image of an object is entered through a photographing lens 200 and a diaphragm 204. The flux of this image is partly reflected by a main mirror 64 in a non-photographing mode. The reflected beam passes a pentaprism 22 and enters into an eye of a photographer via an eye lens 18. In this case, a part of the beam passing the pentaprism 22 enters into a photometric sensor 37 positioned in front of a photometric circuit 106. The photometric circuit 106 sends the photometric result to the microcomputer 100.

A sub mirror 30 reflects the rest of the flux passing the main mirror 64 toward a focus detecting sensor unit 31. The focus detecting sensor unit 31 outputs a focal state. A focus drive circuit 102, controlled by the microcomputer 100, detects the focal state produced by the focus detecting sensor unit 31.

The photometric result and the focal state thus obtained are used when the microcomputer 100 controls, via a lens mount 21 and a lens control circuit 201, an AF drive circuit 202 and a diaphragm drive circuit 203 in response to an instruction given from the switch sensing circuit 105. The switch sensing circuit 105 gives this instruction to the microcomputer 100 in accordance with a photographing mode set by a main switch 43 to turn on the power source, or in accordance with a photographing mode set by a photographing mode setting dial 14, or various settings set by a main operation dial SW 8 or a sub operation dial SW 20.

This AF·AE operation starts with detection of a first release switch (SW1) 7a. A photographing sequence starts with detection of a second release switch (SW2) 7b. When the photographing sequence starts, the microcomputer 100 gives an instruction to a mirror drive circuit 101 to cause the main mirror 64 and the sub mirror 30 to move away out of the flux of the object image.

Then, the microcomputer 100 gives an instruction to a shutter drive circuit 103 to open a shutter 32. Thus, the object image can be formed on a CCD 33 and subsequently converted into a digital signal through sequential processing in a clamp/CDS circuit 34, an AGC circuit 35, and an A/D converter 36.

An image signal processing circuit 104 forms a digital image from the digital signal and sends it via a color liquid crystal drive circuit 109 to a color liquid crystal monitor 19 to display the object image. Furthermore, a buffer memory 37 stores the image which is not yet processed. Moreover, a memory controller 38 can return the image stored in the buffer memory 37 to the image signal processing circuit 104.

Furthermore, the memory controller 38 has the capability of recording the processed image into an external memory 39 or outputting it to an external device via an interface 40. A liquid crystal display drive circuit 107 can control an external liquid crystal display unit 9 or an in-finder liquid crystal display unit 41 to display the state of various settings having been done.

Next, the battery check control performed by the battery check circuit 108 is explained with reference to FIG. 14.

In step S300, the battery check operation starts. In step S301, the pressure sensor 81 detects the pressure within the hydrogen cylinder. The pressure within the hydrogen cylinder detected by the pressure sensor 81 is referred to as 'a'. In step S302, the microcomputer 100 obtains the pressure 'a' within the hydrogen cylinder. In step S303, the temperature sensor 83 detects the temperature within the hydrogen cylinder.

The microcomputer 100, in the step S304, obtains the temperature value of the hydrogen cylinder from the temperature sensor 83. In step S305, the microcomputer 100 reads pressure 'b' and pressure 'c' from the table prepared in the microcomputer. The pressures 'b' and 'c' are pressure values in the pressure equilibrium state corresponding to the obtained temperature.

More specifically, the pressure 'b' represents the pressure in the first pressure equilibrium state. The pressure 'c' represents the pressure in the second pressure equilibrium state. The processing of the steps S301 to S302 may be executed simultaneously with the processing of the steps S303 to S306.

In step S307, the comparator 510 compares the pressure 'a' within the hydrogen cylinder with the pressure 'b' of the first pressure equilibrium state. When the comparison result in the step S307 shows that the pressure 'a' within the hydrogen cylinder is equal to or higher than the pressure 'b' of the first pressure equilibrium state, the battery check circuit 108 produces a first output signal value 700 in step S308 and the external liquid crystal display unit 9 performs a first display in step S309. Then, the battery check ends.

When the pressure 'a' within the hydrogen cylinder is lower than the pressure 'b' of the first pressure equilibrium state, the pressure 'a' within the hydrogen cylinder is further compared with the pressure 'c' of the second pressure equilibrium state in step S310. When the comparison result in the step S310 shows that the pressure 'a' within the hydrogen cylinder is equal to or higher than the pressure 'c' of the second pressure equilibrium state, the battery check circuit 108 produces a second output signal value 701 in step S311 and the external liquid crystal display unit 9 performs a second display in step 312. Then, the battery check ends.

When the pressure 'a' within the hydrogen cylinder is lower than the pressure 'c' of the second pressure equilibrium state, the battery check circuit 108 produces a third output signal value 702 in step S313 and the external liquid crystal display unit 9 performs a third display in step 314. Then, the battery check ends.

Figure 14:
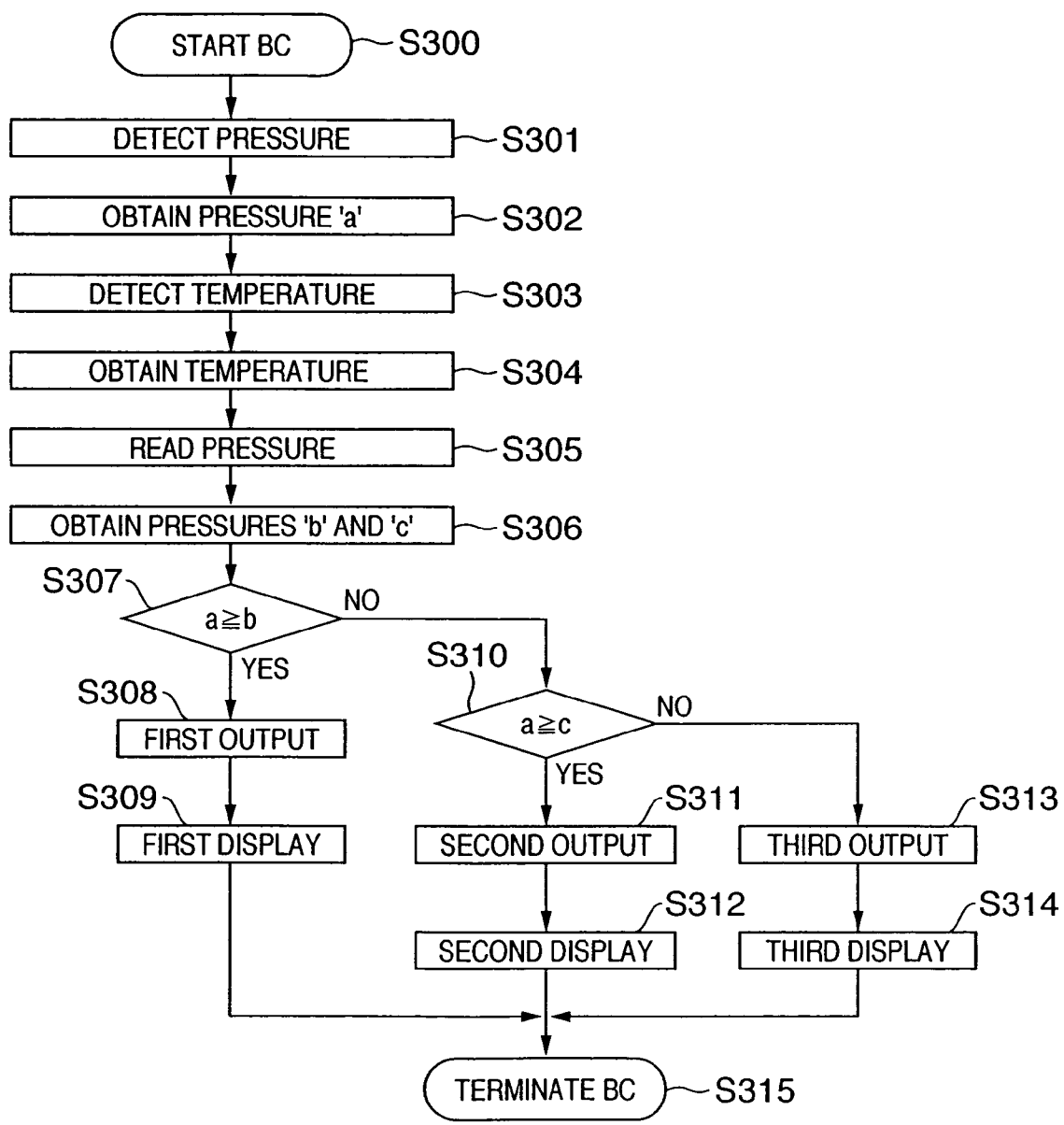
FIG. 14 is a flowchart showing a battery check control in accordance with a third embodiment of the present invention.

The processing shown in the flowchart of FIG. 14 can be repeated at constant time intervals or in accordance with the sequence of an associated device. Furthermore, the first output signal value 700, the second output signal value 701, and the third output signal value 702 have to be mutually different. The output signal values sent from the battery check circuit 108 to the microcomputer 100 in the above-described processing are similar to the first embodiment as shown in FIG. 9.

The liquid crystal display drive circuit 107 receives a display content instruction from the microcomputer 100 and drives the external liquid crystal display unit 9 and the in-finder liquid crystal display unit 41 in accordance with this instruction. Furthermore, the liquid crystal display drive circuit 107 can bring specific segments of the display unit into a flickering state when such an instruction is received from the microcomputer 100.

Figure 15A:
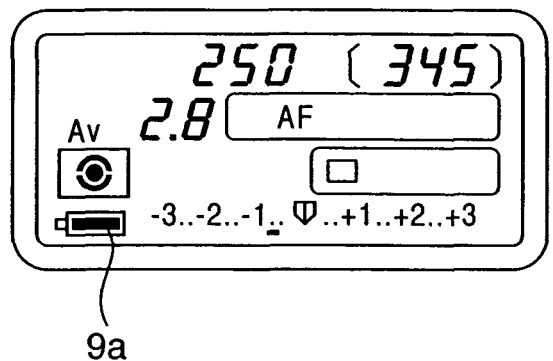
FIGS. 15A, 15B, and 15C illustrate examples displayed on a display section of an external liquid crystal display unit.
Figure 15B:
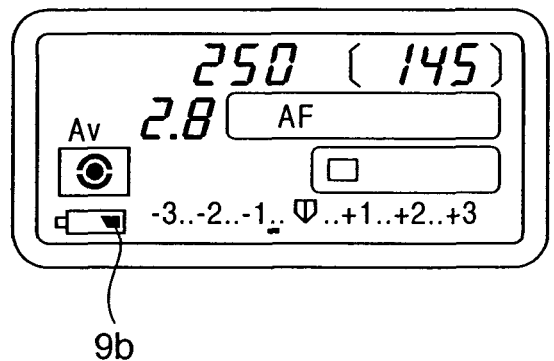
Figure 15C:
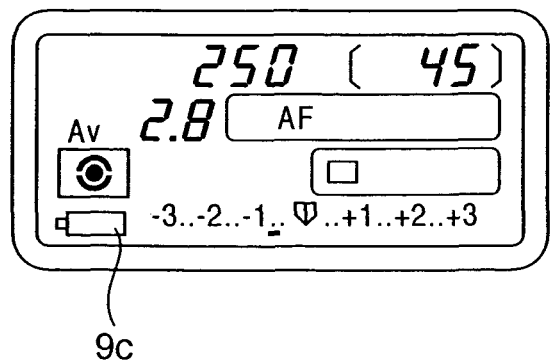
Figure 16:
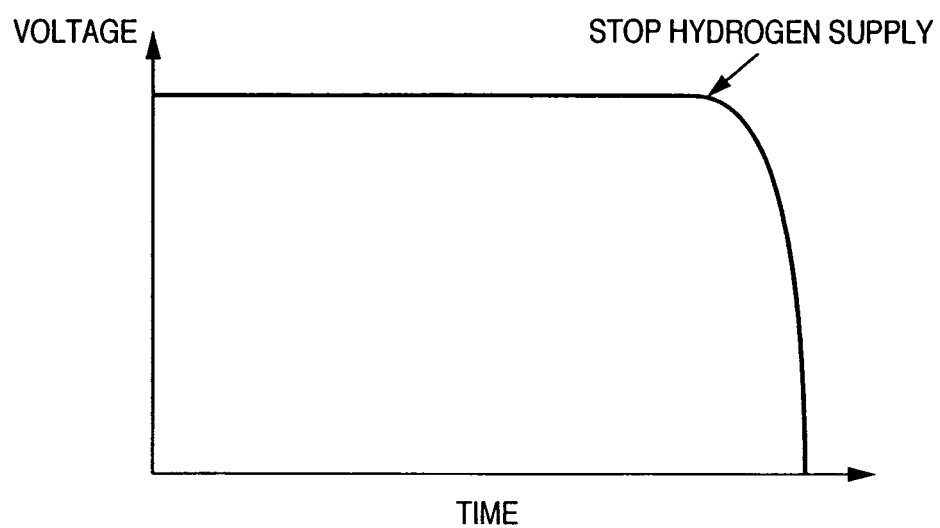
FIG. 16 is a graph showing one example of the electric discharge characteristics of a conventional fuel cell device.

Next, with reference to the illustrations shown in FIGS. 15A, 15B, and 15C, some display patterns of the external liquid crystal display unit 9 are explained.

In FIG. 15A, a fully-charged battery icon 9a is indicating that the fuel residual amount is sufficient. In FIG. 15B, a partly-charged battery icon 9b is indicating that the fuel residual amount is decreased. An empty battery icon 9c shown in FIG. 15C is indicating that there remains no or a very small fuel residual amount.

The microcomputer 100 sends a display content instruction to the liquid crystal display drive circuit 107 in accordance with a signal value received from the battery check circuit 108. For example, when the microcomputer 100 receives the first output signal value from the battery check circuit 108, the liquid crystal display drive circuit 107 causes the external liquid crystal display unit 9 to perform the display shown in FIG. 15A to show that the fuel residual amount is sufficient.

When the microcomputer 100 receives the second output signal value, the liquid crystal display drive circuit 107 causes the external liquid crystal display unit 9 to perform the display shown in FIG. 15B to notify a user of reduction in the fuel residual amount.

Furthermore, when the microcomputer 100 receives the third output signal value, the liquid crystal display drive circuit 107 causes the external liquid crystal display unit 9 to perform the display shown in FIG. 15C to give a warning with respect to the limited fuel residual amount. Then, the camera goes into a shutdown processing to forcibly turn off the power source of the camera.

Although this embodiment is explained based on the fuel tank section having two types of hydrogen storage alloys, it is possible to use three or more hydrogen storage alloys to display a residual amount precisely at much more levels.

Furthermore, application of the present invention is not limited to a camera as an electronic device discussed in the above-described embodiments. The present invention can be applied to other electronic devices, including notebook or laptop PCs, portable telephones, and PDAs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

As many apparently widely different embodiments of the present invention can be made without departing from the spirit and scope thereof, it is to be understood that the invention is not limited to the specific embodiments thereof except as defined in the appended claims.

Claim Of Priority

This application claims priority from Japanese Patent Application No. 2004-281308 filed on Sep. 28, 2004, the entire contents of which are hereby incorporated by reference herein.

The invention claimed is:

1. An electronic device which detects a residual capacity of a fuel cell device, the fuel cell device including a tank section which accommodates a first hydrogen storage alloy having a first desorbed hydrogen pressure in a first pressure equilibrium state and a second hydrogen storage alloy having a second desorbed hydrogen pressure in a second pressure equilibrium state, wherein the first desorbed hydrogen pressure has a higher value than the second desorbed hydrogen pressure, and a power generating section which generates electric power by using hydrogen desorbed from the tank section, comprising:
a pressure detecting unit which detects a pressure of the hydrogen supplied to the power generating section;
a comparing unit;
an output unit for outputting a first signal, a second signal or a third signal; and
a control unit which operates with the electric power supplied from the power generating section, the control unit programmed to control the comparing unit to compare the pressure of the hydrogen detected by the pressure detecting unit with the first desorbed hydrogen pressure and the second desorbed hydrogen pressure, the control unit further programmed to control the output unit to output (i) the first signal if the pressure of the hydrogen detected by the pressure detecting unit is equal to or larger than the first desorbed hydrogen pressure, (ii) the second signal if the pressure of the hydrogen detected by the pressure detecting unit is less than the first desorbed hydrogen pressure and equal to or larger than the second desorbed hydrogen pressure, and (iii) the third signal if the pressure of the hydrogen detected by the pressure detecting unit is less than the second desorbed hydrogen pressure.

2. The electronic device which detects a residual capacity of a fuel cell device according to claim 1, wherein the first and second hydrogen storage alloys are accommodated in the tank section such that a mixing ratio of the first and second hydrogen storage alloys can be changed.

3. The electronic device which detects a residual capacity of a fuel cell device according to claim 1, wherein the tank section has a first space for accommodating the first hydrogen storage and a second space for accommodating the second hydrogen storage alloy, the first and second space are independent each other.

4. The electronic device which detects a residual capacity of a fuel cell device according to claim 1, further comprising a display unit for displaying a residual hydrogen amount based on the output of the output unit.

5. The electronic device which detects a residual capacity of a fuel cell device according to claim 1, wherein the control unit is programmed to control the comparing unit to compare the pressure of the hydrogen detected by the pressure detecting unit with a predetermined shutdown pressure, which is smaller than the second desorbed hydrogen pressure and larger than zero,
wherein the control unit is programmed to control the output unit to output the third signal if the pressure of the hydrogen detected by the pressure detecting unit is less than the second desorbed hydrogen pressure and larger than the predetermined shutdown pressure, and to output a fourth signal if the pressure of the hydrogen detected by the pressure detecting unit is less than the predetermined shutdown pressure.

6. An electronic device which detects a residual capacity of a fuel cell device, the fuel cell device including a tank section which accommodates a first hydrogen storage alloy having a first desorbed hydrogen pressure in a first pressure equilibrium state and a second hydrogen storage alloy having a second desorbed hydrogen pressure in a second pressure equilibrium state, wherein the first desorbed hydrogen pressure has a higher value than the second desorbed hydrogen pressure, and a power generating section which generates electric power by using hydrogen desorbed from the tank section, comprising:

a pressure detecting unit which detects a pressure of the hydrogen supplied to the power generating section; and a control unit which operates with the electric power supplied from the power generating section, the control unit programmed to compare the pressure of the hydrogen detected by the pressure detecting unit with the first desorbed hydrogen pressure and the second desorbed hydrogen pressure, and to output (i) a first signal if the pressure of the hydrogen detected by the pressure detecting unit is equal to or larger than the first desorbed hydrogen pressure, (ii) a second signal if the pressure of the hydrogen detected by the pressure detecting unit is less than the first desorbed hydrogen pressure and equal to or larger than the second desorbed hydrogen pressure, and (iii) a third signal if the pressure of the hydrogen detected by the pressure detecting unit is less than the second desorbed hydrogen pressure, wherein the first signal, the second signal, and the third signal are different from each other.

7. The electronic device which detects a residual capacity of a fuel cell device according to claim 6, wherein the first and second hydrogen storage alloys are accommodated in the tank section such that a mixing ratio of the first and second hydrogen storage alloys can be changed.

8. The electronic device which detects a residual capacity of a fuel cell device according to claim 6, wherein the tank section has a first space for accommodating the first hydrogen storage and a second space for accommodating the second hydrogen storage alloy, the first and second space are independent of each other.

9. The electronic device which detects a residual capacity of a fuel cell device according to claim 6, further comprising a display unit for displaying a residual hydrogen amount based on the output of the output unit.

10. The electronic device which detects a residual capacity of a fuel cell device according to claim 6, wherein the control unit is further programmed to compare the pressure of the hydrogen detected by the pressure detecting unit with a predetermined shutdown pressure, which is smaller than the second desorbed hydrogen pressure and larger than zero, wherein the control unit is further programmed to output the third signal if the pressure of the hydrogen detected by the pressure detecting unit is less than the second desorbed hydrogen pressure and larger than the predetermined shutdown pressure, and to output a fourth signal if the pressure of the hydrogen detected by the pressure detecting unit is less than the predetermined shutdown pressure.

* * * * *